May 29, 1962 C. W. CROSBY 3,036,681
CLUTCH
Filed April 1, 1959
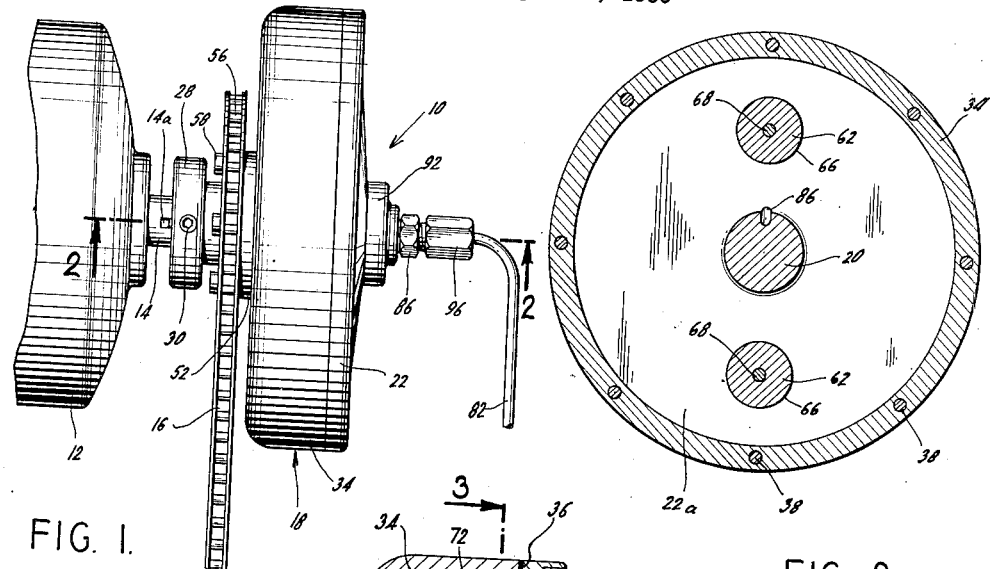
FIG. 1.
FIG. 3.
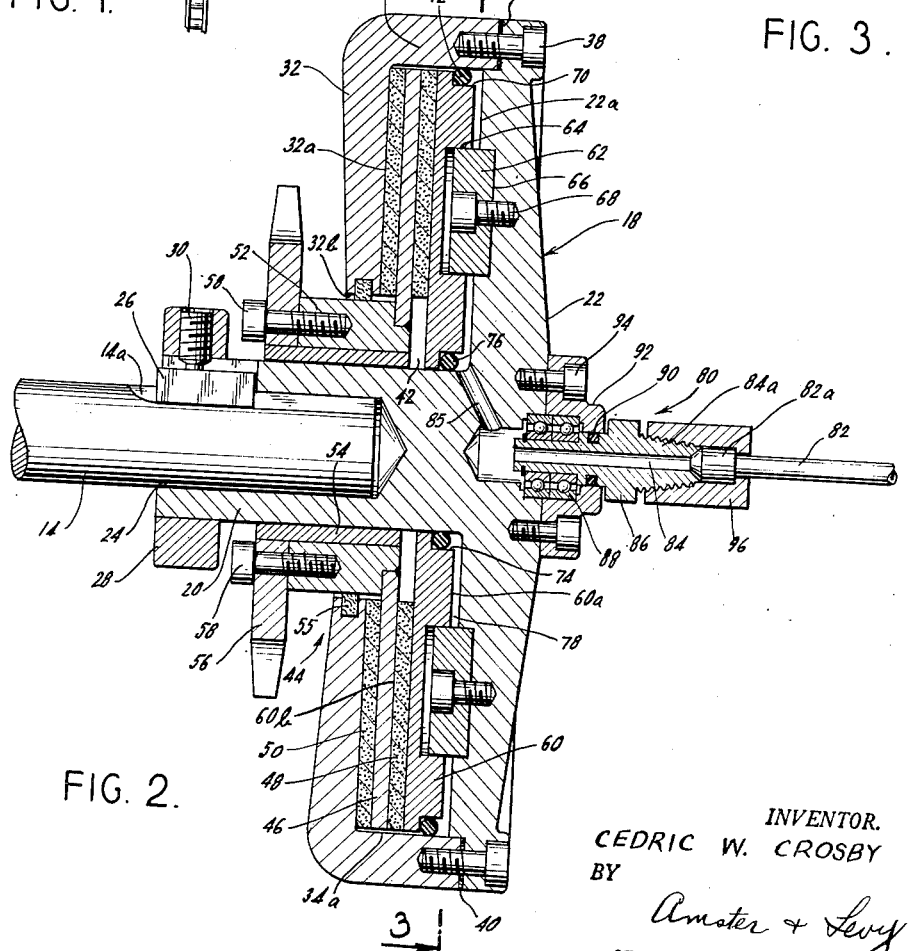
FIG. 2.
INVENTOR.
CEDRIC W. CROSBY
BY
Amster & Levy
ATTORNEYS

3,036,681
CLUTCH

Cedric W. Crosby, Austin, Pa., assignor to Emporium Specialties Co., Inc., Emporium, Pa.
Filed Apr. 1, 1959, Ser. No. 808,264
1 Claim. (Cl. 192—85)

The present invention relates to clutches, and in particular to an improved air-operated clutch adapted for attachment to a drive.

Air-operated clutches are generally known which comprise a housing in which there is mounted a clutch plate serving as a driving element. The clutch plate is moved into engagement with a further clutch plate, serving as a driven element, in response to the introduction of air into a chamber bounded at one side thereof by the driven element.

Broadly it is an object of the present invention to provide an improved clutch of the aforesaid general character. Specifically, it is within the contemplation of the present invention to provide an air-operated clutch which is relatively simple to construct and can be produced on a mass production basis at relatively low unit cost.

It is a further object of the present invention to provide an improved air-operated clutch of the slip type which is constructed to incorporate the requisite wearing surfaces for distribution of slip and is capable of service for long periods of use with the requisite performance characteristics.

It is a still further object of the present invention to provide an improved air-operated slip clutch which is capable of carrying a relatively high torque load.

It is yet a further object of the present invention to provide a clutch which is constructed in the manner to facilitate versatility in making driving connections thereto. Advantageously, the improved clutch of the present invention is capable of driving sprockets, pulleys and gearing in accordance with varying operational requirements.

In accordance with the illustrative embodiment demonstrating objects, features and advantages of the present invention there is provided an air-operated clutch which comprises a clutch housing including an axially disposed shaft adapter adapted to be secured to a drive source. The housing further includes a face plate and a back plate operatively connected to the shaft adapter and cooperating therewith to define a substantially cylindrical housing cavity. A driven assembly is disposed within the housing cavity having an output means external to said cavity, with means journaling the driven assembly on the shaft adapter. A clutch plate is disposed within the housing cavity intermediate the face plate and the driven assembly and is slidably mounted on and coupled to the shaft adapter. Means cooperate with the clutch plate and the face plate to form a pressure chamber, with provision for introducing air under pressure into the chamber for urging the clutch plate into contact with the driven assembly for coupling the shaft adapter to the driven assembly.

The above brief description as well as further objects, features and advantages of the present invention will be more fully appreciated by reference to the following detailed description of a presently preferred, but illustrative embodiment according to the present invention, when taken into conjunction with the accompanying drawings wherein:

FIG. 1 is a plan view with parts broken away showing an improved air-operated clutch according to the present invention secured to the output shaft of a motor;

FIG. 2 is a sectional view on an enlarged scale, taken substantially along the lines 2—2 of FIG. 1 and looking in the direction of the arrows; and, FIG. 3 is a sectional view on a reduced scale, taken substantially along the lines 3—3 of FIG. 2 and looking in the direction of the arrows.

Referring now specifically to the drawings there is shown in FIG. 1 an improved air-operated clutch in accordance with the present invention, generally designated by the reference numeral 10, which is driven from a motor 12 having an output shaft 14. The output from the clutch 10 in this embodiment of the invention is a drive chain 16 which is coupled to an appropriate sprocket forming part of the clutch, as will be subsequently described.

The clutch 10 comprises a clutch housing 18 which includes a central hub having at its left end as viewed in FIG. 2 an axial shaft adapter 20. At its other end, the hub has provisions for the securement of a rotary fluid coupling to supply fluid to the clutch 10 in a manner to be described below. A radially-extending facing plate 22 is integrally formed with the hub at the end removed from the shaft adapter 20. The axial shaft adapter 20 is formed with an axial bore 24 extending inwardly from one end thereof, which bore is of a diameter to receive the output or drive shaft 14 of the motor 12. The drive shaft 14 is formed with a longitudinally extending keyway 14a which receives a key 26. Fitted over the adjacent end of the axial shaft adapter 20 is a shaft assembly collar 28 which is secured in place and to the key 26 by a tapped set screw 30 which extends radially through the shaft assembly collar 28 and has its leading end in engagement with the key 26 in the keyway 14a. The key, keyway and shaft assembly collar provide a convenient means for securing the axial shaft adapter 20 and the integral facing plate 22 to the output shaft 14 of the motor 12.

Disposed rearwardly of the facing plate 22 is a backing plate 32 which is formed with an integral cylindrical marginal flange 34 projecting towards the outer margin of the facing plate 22. The end of the marginal cylindrical flange 34 is received within an annular seat 36 formed at the outer pheriphery of the facing plate 22, with the facing plate 22 and backing plate 32 being secured together at such outer margin by a number of machine bolts 38, with an appropriate gasket 40 interposed therebetween to provide a seal at the margins of the facing and backing plates respectively. The facing and backing plates 22, 32 cooperate to define a cavity 42 having a substantially cylindrical bounding wall 34a at its outer circumferential extent and radially extending walls 22a, 32a at its opposite sides. The facing and backing plates 22, 32 may be formed by forgings or castings, and are of a design to withstand the pressures encountered during use.

Disposed within the cavity 42 is a circular plate 46 of a driven assembly, the latter being generally designated by the reference numeral 44. The driven assembly 44 includes the driven clutch plate 46 disposed within the cavity 42 having secured to the opposite faces thereof annular discs 48, 50 of an appropriate clutch facing material. The driven clutch plate 46 is secured to a mounting sleeve 52, as by being welded thereto, with the mounting sleeve 52 extending through a central bore 32b formed in the backing plate 32 and being mounted on the shaft adapter 20 by an appropriate bearing sleeve 54. A sealing washer 55 is interposed between the mounting sleeve 52 and the adjacent wall of the central bore 32b in the backing plate 32. In this illustrative embodiment, the outer end of the mounting sleeve 52 carries an output sprocket 56 which is secured thereto by appropriate machine bolts 58, the output sprocket 56 having trained thereover the output chain 16 which is coupled to the piece of equipment to be driven by the clutch 10.

Interposed between the driven clutch plate 46 of the driven assembly 44 and the facing plate 22 of the housing 18 is a driving clutch plate 60. The driving clutch plate 60 is slidably mounted for axial displacement relative to the shaft adapter 20 by provision of a number of circumferentially spaced keys 62 which are received in appropriate key guideways 64 formed in the driving clutch plate 60. Specifically, two circular keys 62 are provided at opposite sides of the shaft adapter 20, with the keys 62 each being secured in corresponding circular seats 66 formed in the adjacent inner face 22a of the facing plate by an appropriate bolt 68. The complementary circular key guideways 64 are formed in the adjacent face 60a of the driving clutch plate, with the opposite face 60b contacting the adjacent disc 48 of the driven assembly 44.

Provision is made both at the inner and outer peripheries of the driving clutch plate 60 for providing an airtight seal to the housing 18. Specifically, an outer circumferential seat 70 is provided at the outer circumference or periphery of the driving clutch plate 60 having thereon an O-ring seal 72 in engagement with the adjacent cylindrical wall or surface 34a of the flange 34 of the housing 18. An inner circumferential or peripheral seat 74 is provided at the inner circumference or periphery of the driving clutch plate 60 and has thereon an inner O-ring seal 76 in contact with the adjacent surface of the shaft adapter 20. The facing plate and the driving clutch plate 60 cooperate to provide a substantially airtight variable volume pressure chamber 78 therebetween, the pressure chamber being bounded on one of its sides by the inner face 22a of the facing plate 22 and at the other of its sides by the adjacent face 60a of the driving clutch plate 60.

Provision is made for selectively introducing air under pressure into the chamber 78 for axially displacing the clutch plate 60 into non-slipping engagement with the driven clutch plate 46 for coupling the driving element of the clutch 10 to the driven element thereof. Specifically, a rotatable coupling, generally designated by the reference numeral 80, connects an air inlet hose 82 through an air inlet passage 84 and a branch passage 85 to the pressure chamber 78. The rotatable coupling 80 includes an air inlet nipple 87 formed with the air inlet passage 84 longitudinally thereof with the nipple being rotatably journaled axially of the clutch 10 by one or more bearings 88. In order to preclude air leakage, an appropriate sealing ring or washer 90 is seated on the nipple 86 and engages an attachment collar 92 which is secured to the adjacent outer face of the facing plate 22 by one or more bolts 94. The air inlet hose 82 is secured to the integral threaded extension 84a of the nipple 84 by means of a complementary threaded fitting 96 on the head end 82a of the air inlet hose 82.

In actual use, when air under pressure is introduced via the air inlet hose 82 to the pressure chamber 78, the driving clutch plate 60 is urged into frictional engagement with the driven clutch plate 48 such that the clutch housing which is secured to the drive shaft 14 of the drive source 12 is effectively coupled to the sprocket 56 of the driven assembly. When the air is cut off, the clutch almost instantaneously decouples due to slippage between the driving and driven clutch elements.

It may be appreciated from the illustrative embodiment, that the construction of the clutch is relatively simple and is capable of use over prolonged periods without servicing. As the friction discs 48, 50 of the driven assembly wear, the requisite clutching force is still developed in that the driving clutch plate is merely displaced through a somewhat larger axial throw by the introduction of air under pressure into the pressure chamber 78. The clutch is essentially compact and may be readily mounted on any one of a number of drive sources, with versatility in the type of output coupling thereto. For example, the driven sprocket 56 of the assembly 44 may be readily replaced by a pulley or gear in accordance with the environment in which the clutch is to be employed. Still further it is a relatively simple matter to integrate the control of the clutch into the operation of a machine since the admission of air under pressure into the clutch via the air inlet line 82 may be controlled by a solenoid controlled valve or similar control element.

A latitude of modification change and substitution is intended in the foregoing disclosure, and in some instances some features of the invention will be used without a corresponding use of other features. Accordingly, it is appropriate that the claim be construed broadly and in a manner consistent with the spirit and scope of the invention.

What is claimed is:

A fluid-operated clutch adapted to be mounted on a shaft comprising a clutch housing including an elongated hub having a shaft adapter at one end formed with an axial opening adapted to receive a shaft, securement means for securing said adapter to a shaft, a facing plate integrally formed with said hub and extending at right angles to and coaxial with said hub, a backing plate spaced from and coaxial with said facing plate, said backing plate having a central opening therein said hub extending through and beyond said central opening, and a peripheral flange interconnecting said facing plate and said backing plate forming an internal cavity within said housing, a clutch plate positioned within said internal cavity and about said hub, coupling means mounting said clutch plate for rotation with said housing and for axial movement toward and away from said facing plate, said clutch plate and said facing plate forming a variable volume chamber with said hub and said peripheral flange, sealing means for preventing loss of fluid from said chamber, a driven member positioned between said clutch plate and said backing plate and mounted for rotation on said hub, friction means on said driven member and on said clutch plate and said backing plate for driving said driven member when said clutch plate is moved away from said facing plate into operative engagement with said driven member, power transmitting means rotatable on said hub and connected to said driven member, passage means in said housing including an entry port formed in the center of said facing plate on the side thereof opposite from said axial opening isolated from said axial opening and a radially extending passageway in communication with said entry port and said chamber for the entry of fluid into said chamber to increase the volume thereof for engaging said friction means to interconnect said clutch housing and said driven member, and rotatable fluid coupling means connected to said housing at the port in said facing plate for delivering a supply of fluid to said chamber to operate said clutch.

References Cited in the file of this patent

UNITED STATES PATENTS

| | | |
|---|---|---|
| 660,749 | Cunningham | Oct. 30, 1900 |
| 1,879,633 | Olsen et al. | Sept. 27, 1932 |
| 2,555,772 | Wickwire | June 5, 1951 |
| 2,594,666 | Long | Apr. 29, 1952 |
| 2,684,742 | Eason | July 27, 1954 |
| 2,729,319 | Friedman | Jan. 3, 1956 |
| 2,883,026 | Banker | Apr. 21, 1959 |

FOREIGN PATENTS

| | | |
|---|---|---|
| 526,533 | Belgium | Mar. 25, 1954 |